United States Patent [19]
Hara

[11] Patent Number: 5,377,684
[45] Date of Patent: Jan. 3, 1995

[54] ULTRASONIC DOPPLER DIAGNOSIS APPARATUS

[75] Inventor: Kiyoshi Hara, Ootawara, Japan

[73] Assignee: Kabushiki Kaisha toshiba, Kawasaki, Japan

[21] Appl. No.: 953,867

[22] Filed: Sep. 30, 1992

[30] Foreign Application Priority Data

Oct. 4, 1991 [JP] Japan .................................. 3-257777

[51] Int. Cl.$^6$ .............................................. A61B 8/06
[52] U.S. Cl. ........................................... 128/661.09
[58] Field of Search .............. 128/661.09, 660.05; 73/861.25

[56] References Cited

U.S. PATENT DOCUMENTS

| 4,641,668 | 2/1987 | Namekawa | 128/661.09 |
| 4,768,515 | 9/1988 | Namekawa | 128/661.08 |
| 5,042,491 | 8/1991 | Amemiya | 128/661.09 |
| 5,190,044 | 3/1993 | Kawasaki et al. | 128/661.09 |
| 5,279,302 | 1/1994 | Tamano et al. | 128/661.09 |

*Primary Examiner*—Francis Jaworski
*Attorney, Agent, or Firm*—Finnegan, Henderson Farabow, Garrett & Dunner

[57] ABSTRACT

An ultrasonic Doppler diagnosis apparatus according to the present invention comprises a scanner for scanning a two-dimensional region of a subject with an ultrasonic beam, a detector for detecting a Doppler deviation frequency of a predetermined moving object in response to a signal output from the scanner, a calculator for calculating a rate of variation between at least two Doppler deviation frequencies detected by the detector at different times, a supplier for supplying color information to the rate of variation in accordance with the levels of the Doppler deviation frequencies, and a display for two-dimensionally displaying the rate of variation to which the color information is supplied by the supplier.

7 Claims, 4 Drawing Sheets

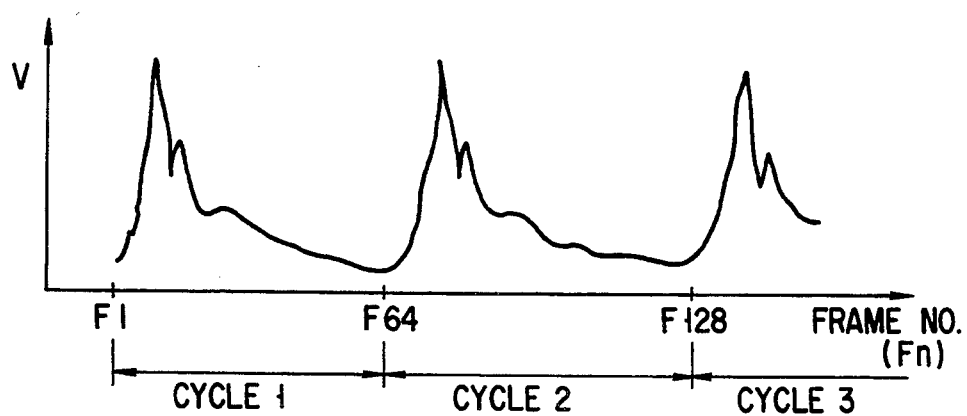
F I G. 3
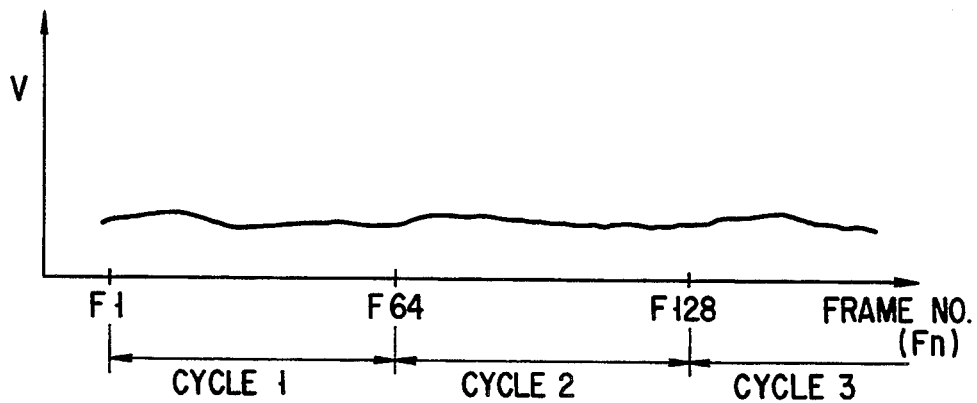
F I G. 4
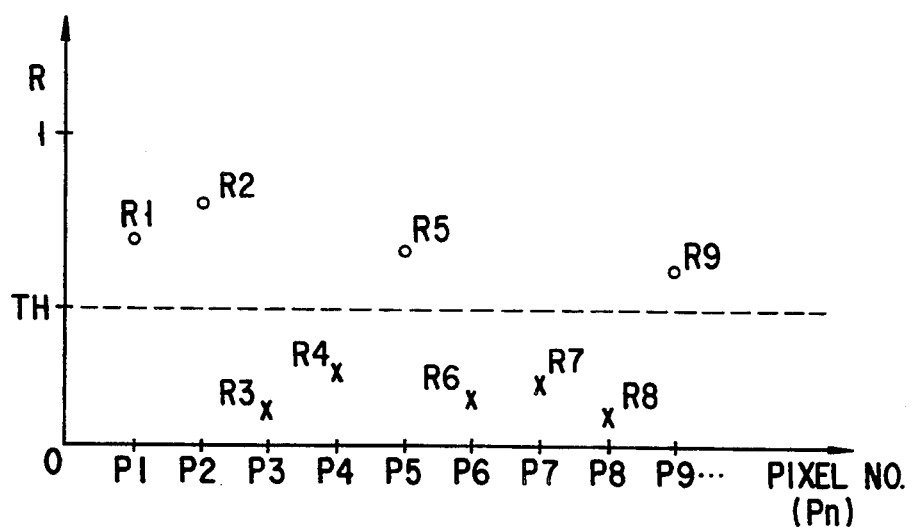
F I G. 5

ULTRASONIC DOPPLER DIAGNOSIS APPARATUS

BACKGROUND OF THE INVENTION

1. Field of the Invention

The present invention relates to an ultrasonic Doppler diagnosis apparatus using a color mapping technique for two-dimensionally displaying an image of blood flowing in a heart or vessels.

2. Description of the Related Art

A conventional ultrasonic Doppler diagnosis apparatus is developed based on the principle that an amount of deviation between a transmission frequency and a reception frequency, that is, a deviation frequency between them depends upon a speed component of a moving object (corpuscles) in the direction of an ultrasonic beam. Flowing blood is imaged in blue/red and others in accordance with the positive/negative of the deviation frequency and its brightness is varied with the level of the deviation frequency.

Assuming that the transmission frequency is f0, the reception frequency is f1, the deviation frequency is fd, the speed of the flowing blood is V, the sonic speed in a medium is C, and the angle between the direction of the ultrasonic beam and that of the flowing blood is $\theta$, the relationship between f1 and f0 is expressed by the following equation (1), and the relationship between fd and V is expressed by the following equation (2).

$$f1 = \{(1 + V \cdot \cos\theta/C)/(1 - V \cdot \cos\theta/C)\} \cdot f0 \quad (1)$$
$$= (1 + 2V \cdot \cos\theta/C) \cdot f0$$

$$fd = f1 - f0 = (2V \cdot \cos\theta/C) \cdot f0 \quad (2)$$

As is seen from the equation (2), the speed V is in proportion to the deviation frequency fd and in inverse proportion to the angle $\theta$. Since, however, vessels complicatedly run in a body, it is actually impossible to measure the angle $\theta$. Imaging the flowing blood therefore depends upon the angle $\theta$ and, in other words, it has an angle dependence characteristic. The angle dependence characteristic causes the following drawbacks.

Even though the speeds of the flowing blood at two observation points (crossings between the flowing blood and the ultrasonic beam) are the same, different results are obtained since the angles 8 at the two observation points differ from each other. It is thus difficult to quantitatively measure the speed of the flowing blood.

Assuming that an observation point in the flowing blood is a sound source, the direction of the flowing blood is divided at the observation point into two directions coming near to and going away from the observation point and, in other words, the positive and negative of the deviation frequency fd are changed to each other at the observation point. The flowing blood is thus displayed in different colors, though the same blood flows in one direction. It is thus necessary to distinguish between arteries and veins and to detect abnormal flowing blood such as shunt and regurgitation in consideration of the angle dependence characteristic, and it is very troublesome to do so.

SUMMARY OF THE INVENTION

An object of the present invention is to provide an ultrasonic Doppler diagnosis apparatus capable of quantitatively measuring the speed of flowing blood by imaging the flowing blood free of angle dependence characteristic, and easily distinguishing between arteries and veins and detecting abnormal flowing blood.

An ultrasonic Doppler diagnosis apparatus according to the present invention comprises a scanner for scanning a two-dimensional region of a subject with an ultrasonic beam. A detector is provided for detecting a Doppler deviation frequency of respective positions included in the two-dimensional region based on a signal output from the scanner.

A calculator calculates a rate of variation between two Doppler deviation frequencies of the same position, which are detected by the detector at different times. A converter converts a color signal to the rate of variation in accordance with a level of the rate of variation. A display is provided for displaying a two-dimensional distribution of the color signal.

In the ultrasonic Doppler diagnosis apparatus according to the present invention, since a rate of variation between at least two Doppler deviation frequencies detected at different times is calculated, flowing blood free of the influence of an angle between the direction of an ultrasonic beam and that of a moving object, i.e., free of angle dependence characteristic which is an indefinite factor, can be imaged.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a graph showing a variation in average speed of corpuscles at a certain point of the artery system;

FIG. 4 is a graph showing a variation in average speed of corpuscles at a certain point of the vein system;

FIG. 5 is a view showing the distribution of speed variation rates of a speed variation rate image;

DETAILED DESCRIPTION OF THE PREFERRED EMBODIMENTS

An embodiment of the present invention will now be described, with reference to the accompanying drawings.

Figure 1:
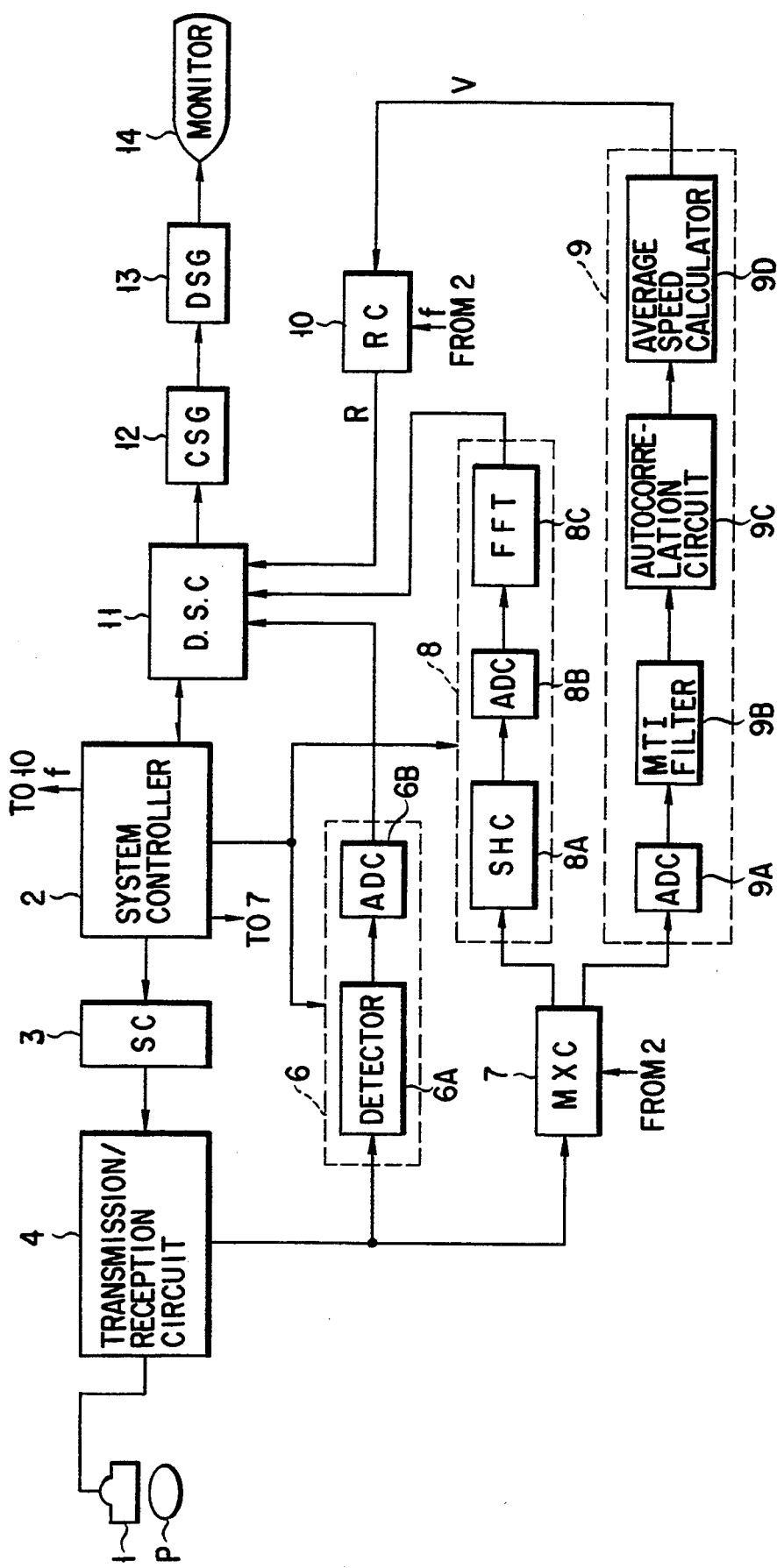
FIG. 1 is a block diagram showing a structure of an ultrasonic Doppler diagnosis apparatus according to a first embodiment of the present invention.

FIG. 1 shows the structure of an ultrasonic Doppler diagnosis apparatus according to this embodiment. An ultrasonic probe 1 having a plurality of ultrasonic transducers arranged in parallel to one another, is driven by a drive pulse generated from a scan controller (SC) 3 and a transmission/reception circuit 4 in response to a reference signal output from a system controller 2, and two-dimensionally scans a body with an ultrasonic beam. A wave reflected by the body is received again by the probe 1. The transmission/reception circuit 4 supplies the wave with a delay time which is opposite to that in transmission of the ultrasonic beam and amplifies it to a predetermined level. The amplified wave is then transmitted to a B-mode processing system 6 and a mixing circuit (MXC) 7. The B-mode processing system 6 detects a signal output from the transmission/reception circuit 4 using a detector 6A, and supplies it to a digital scan converter (DSC) 11 through an analog digital converter (ADC) 6B.

The mixing circuit 7 mixes the signal output from the transmission/reception circuit 4 with the reference signal output from the system controller 2, eliminates a high-frequency component from the mixed signal, and supplies it to a one-point Doppler system 8 and a moving target indicator (MTI) system 9.

The one-point Doppler system 8 is a circuit for measuring the speed of flowing blood at an observation point (sample point) designated by an operator, and includes a sample hold circuit (SHC) 8A, an ADC 8B and a fast Fourier transform circuit (FFT) 8C. The SHC 8A holds the signal output from the mixing circuit 7 based on the depth of the observation point. The FFT 8c analyzes the frequency of an output signal of the SHC 8A by means of the ADC 8B to generate a deviation frequency (Doppler shift) at the observation point, and transmits the Doppler shift to the DSC 11. Since the Doppler shift is corrected by the DSC 11 based on an angle $\theta$ between the direction of the ultrasonic beam and that of the flowing blood measured by various methods, the speed of the flowing blood can be measured.

The MTI system 9 produces flowing blood information (average speed V) including a large number of points in real time, and comprises an ADC 9A, an MTI filter 9B, an autocorrelator (ACC) 9C, and an average speed calculator (ASC) 9D. A signal output from the mixing circuit 7 is supplied to the MTI filter 9B through the ADC 9A. The MTI filter 9B eliminates a clutter component of a slow moving object such as a heart from the output signal of the mixing circuit 7, and sends it to the ACC 9C. The ACC 9C analyzes the frequency of an output signal of the MTI filter 9B to detect a deviation frequency (Doppler shift) of a specific moving target (corpuscles) at the large number of points and supply the Doppler shift to the ASC 9D. The ASC 9D performs a predetermined operation on the Doppler shift to generate an average speed V and supply it to a rate calculator (RC) 10. The MTI filter 9B is one of band-pass filters adopting a technique which has been commonly used in the field of radar for detecting only the target moving within a predetermined speed, using the Doppler effect. The moving target in this case is a corpuscle which moves at considerably higher speed than an organ such as a heart moves.

Figure 2:
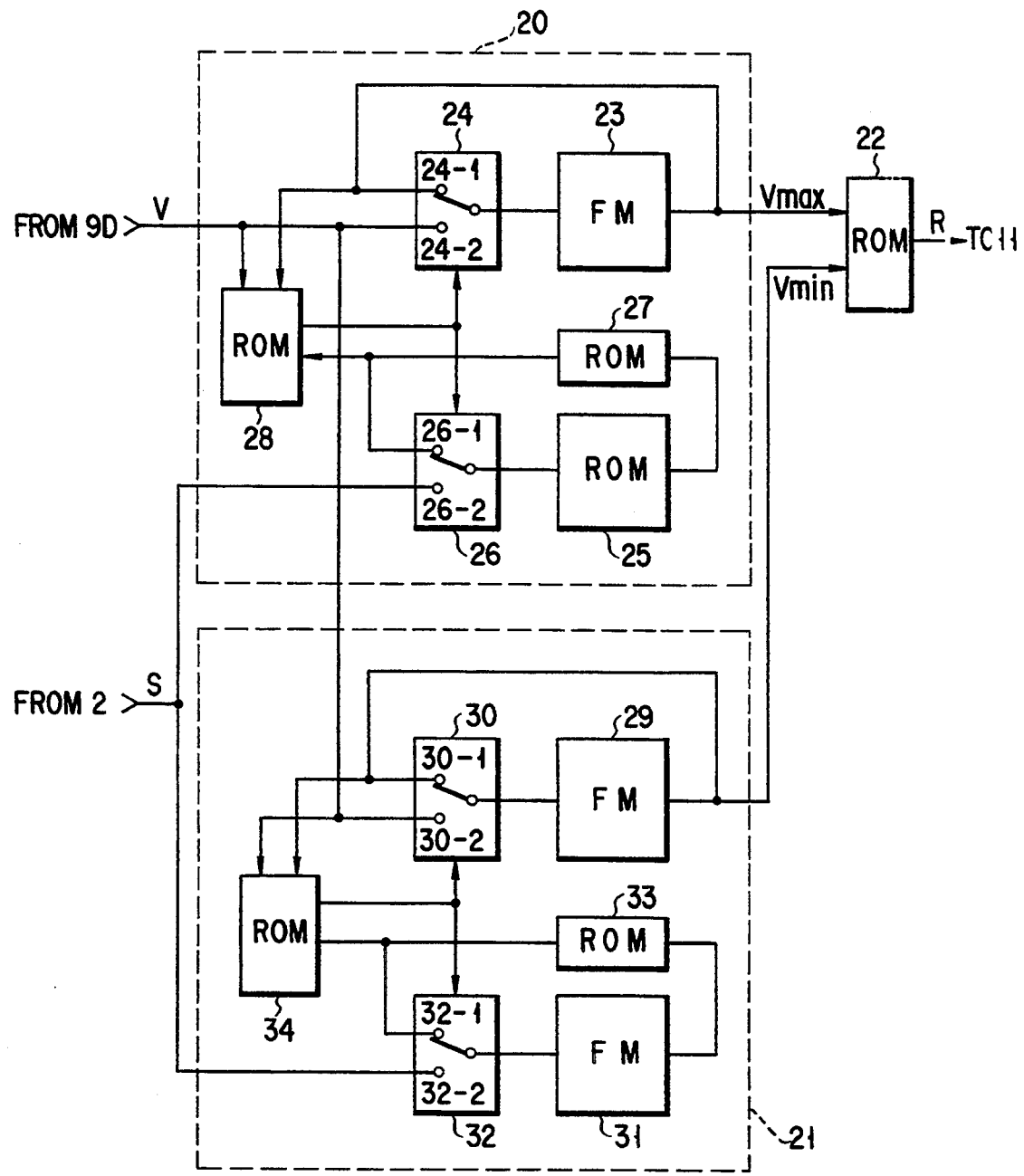
FIG. 2 is a block diagram showing a structure of a rate calculator of the ultrasonic Doppler diagnosis apparatus shown in FIG. 1.

The rate calculator 10 for receiving an output signal from the MTI system 9 has a structure as shown in FIG. 2. In the rate calculator 10, a maximum hold circuit 20 selects the maximum speed Vmax from a plurality of average speeds V supplied from the ASC 9D of the MTI system 9 within one cycle corresponding to cycle data S (the number of frames corresponding to a period of heartbeat of a subject, for example, 64 frames) output from the system controller 2, and a minimum hold circuit 21 selects the minimum speed Vmin from the average speeds V. These maximum and minimum speeds Vmax and Vmin are supplied to a read-only memory (ROM) 22 as address signals, and a speed variation rate R expressed by the following equation (3) is supplied to the DSC 11.

$$R = (V_{max} - V_{min})/V_{max} \tag{3}$$

The average speeds V have an angle dependence characteristic of the angle $\theta$ between the direction of the ultrasonic beam and that of the flowing blood. However, as is seen from the equation (3), the speed variation rate R has no angle dependence characteristics since R is expressed as a ratio of the average speeds V.

The maximum hold circuit 20 is constituted, as shown in FIG. 2, to select the maximum speed Vmax during a period of heartbeat. In the maximum hold circuit 20, a frame memory 23 for holding the maximum speed Vmax is connected to the ASC 9D via an input terminal 24-2 of a switch 24, and connected to its own self via an input terminal 24-1 of the switch 24. In the circuit 20, a frame memory 25 for holding the cycle data is connected to the system controller 2 via an input terminal 26-2 of a switch 26, and connected to its own self via a ROM 27 for subtraction and an input terminal 26-1 of the switch 26. Furthermore, in the circuit 20, a ROM 28 for supplying a switching signal to the switches 24 and 26, is connected to the ASC 9D, frame memory 23, and ROM 27.

The minimum hold circuit 21 has the same structure as that of the maximum hold circuit 20. In the minimum hold circuit 21, a frame memory 29 for holding the minimum speed Vmin is connected to the ASC 9D via an input terminal 30-2 of a switch 30, and connected to its own self via an input terminal 30-1 of the switch 30. In this circuit 21, a frame memory 31 for holding the cycle data is connected to the system controller 2 via an input terminal 32-2 of a switch 32, and connected to its own self via a ROM 33 for subtraction and an input terminal 32-1 of the switch 32. Furthermore, in the circuit 21, a ROM 34 for supplying a switching signal to the switches 30 and 32, is connected to the ASC 9D, the frame memory 29, and the ROM 33.

The DSC 11 generates a two-dimensional image by two-dimensionally arranging the speed variation rates R at a number of points supplied from the ROM 22 of the rate calculator 10. The two-dimensional image is supplied with color data from a color signal generator (CSG) 12 in accordance with the level of the speed variation rate R, and transmitted to a monitor 14 through a digital/analog converter (DAC) 13. The image is thus displayed on the monitor 14.

An operation of the rate calculator 10 will be described. Assume that the cycle data supplied from the system controller 2 is set to 64 frames corresponding to a period of heartbeat of a subject.

When the probe 1 is driven in response to a drive pulse from the transmission/reception circuit 4, it transmits an ultrasonic pulse to the body at a fixed repetition frequency (rate frequency) and receives a reflected wave from the body. The reflected wave is amplified to a predetermined level by the transmission/reception circuit 4, and sent to the MTI system 9 through the mixing circuit 7. An output signal of the mixing circuit 7 is transmitted to the MTI filter 9B through the ADC 9A. Since the MTI filter 9B eliminates a clutter component due to a side lobe or the like from the reflected wave at each of the points in real time, only the reflected component is selected from the reflected wave. The frequency of the reflected component is analyzed by the ACC 9C and then processed by the ASC 9D to obtain the average speed V.

The average speed V is supplied to the rate calculator 10 and processed therein as described below.

The switches 24, 26, 30 and 32 select their input terminals 24-2, 26-2, 30-2, 32-2 at the beginning of one cycle. Therefore, the average speed V is held in pixel elements corresponding to the positions of the frame memories 23 and 29, and the cycle data (64 frames) supplied from the system controller 2 is held in the same pixel element of the frame memories 25 and 31.

The average speed V held in the frame memories 23 and 29 and the cycle data held in the frame memories 25 and 31 are output when a new average speed V is supplied from the ASC 9D. Therefore, the ROMs 28 and 34 receive the new average speed V, the average speed V from the frame memories 23 and 29, and the results obtained by subtracting one count from the cycle data supplied from the frame memories 25 and 31 through the ROMs 27 and 33.

When the subtraction result is not "0", that is, when one cycle is not completed, the ROM 28 of the maximum hold circuit 20 selects one of the input terminals (24-1) and (24-2) of the switch 24 to supply a higher one of the new average speed V and the average speed V from the frame memory 23 to the memory 23, and also selects the input terminal (26-1) of the switch 26 to return the subtraction result to the frame memory 25. This selection is repeated until the cycle changes to the next cycle. When the cycle is completed, the frame memory 23 holds the maximum speed Vmax of the plural average speeds V supplied from the ASC 9D during the cycle. When the subtraction result is "0" and the cycle changes to the next cycle, the ROM 28 always selects the input terminals (24-2) of the switches 24 and 26 to supply the average speed V input at the beginning of the next cycle to the frame memory 23 and to supply the cycle data (64 frames) from the system controller 2 to the frame memory 25. Thus the same operation as above is performed.

The ROM 34 of the minimum hold circuit 21 controls the switch 30 to supply a lower one of the new average speed V and the average speed V from the frame memory 29. When the cycle is completed, the frame memory 29 holds the minimum speed Vmin of the plural average speeds V supplied from the ASC 9D during the cycle. The other operation is the same as that of the maximum hold circuit 20.

These maximum and minimum speeds Vmax and Vmin are supplied to the ROM 22 as address signals, and the speed variation rate R obtained from the equation (3) is output from the ROM 22. The speed variation rate R is calculated for every point, and the calculated speed variation rates are arranged two-dimensionally and converted into two-dimensional speed variation rate images by the DSC 11.

The speed variation rates R clearly differ in level between the artery and vein systems. FIG. 3 shows a general variation in the average speed V of an observation point of the artery system, FIG. 4 shows a general variation in the average speed V of an observation point of the vein system, and FIG. 5 shows the distribution of speed variation rates of a speed variation image. In FIG. 5, "o" represents the artery system, and "x" indicates the vein system. Comparing FIGS. 3 and 4, the average speed V of the vein system is not so changed but virtually constant, and the average speed V of the artery system is greatly changed in accordance with heartbeat. While the level of the speed variation rate R of the vein system is considerably closer to "0", that of the speed variation rate R of the artery system is considerably closer to "1". More specifically, if the speed variation rates R are compared with the threshold value TH as shown in FIG. 5, the CSG 12 is able to clearly distinguish the speed variation rates R of the artery and vein systems from each other. Since the CSG 12 generates color signals of different color phases, the artery and vein systems can be clearly distinguished and displayed in different colors.

As described above, since, in the present invention, the two-dimensional distribution of speed variation rates, which do not depend upon an angle between the directions of an ultrasonic beam and flowing blood, can be displayed in colors, the flowing blood of the artery system and that of the vein system can be distinguished from each other in different colors. If a backward flow is partially caused in these systems, the sign of the average speed of the backward flow is inevitably opposite to that of the average speed of the forward flow, and the speed variation rate R of the backward flow exceeds "1". Therefore, in the present invention, the backward flow can be easily found. Since the speed variation rate does not depend upon the angle describe above, it can be regarded as an index of quantitative measurement of resistance of blood flowing in vessels.

An ultrasonic Doppler diagnosis apparatus according to a second embodiment of the present invention will now be described.

While the feature of the first embodiment is that the speed variation rate R is calculated from the maximum speed Vmax and the minimum speed Vmin during a period of heartbeat (one cycle), the feature of the second embodiment is that the speed variation rate R is calculated from the average speeds Vn and Vn−1 of adjacent two frames. Since the second embodiment differs from the first embodiment only in the rate calculator, only the structure of the rate calculator will be described.

Figure 6:
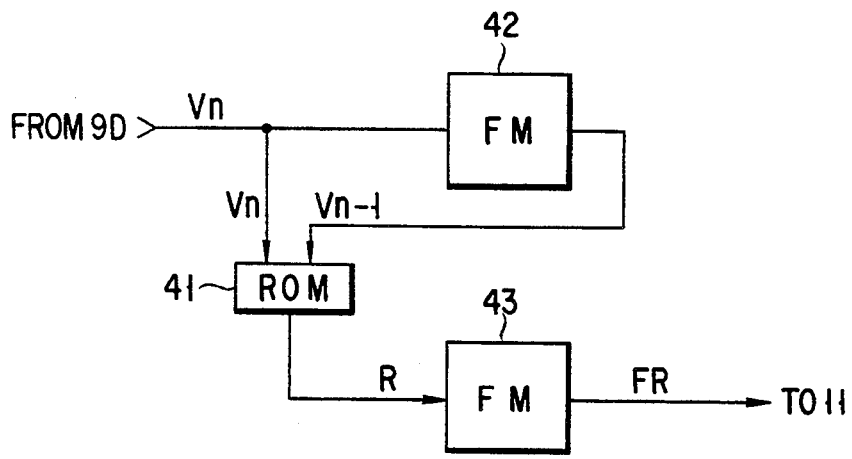
FIG. 6 is a block diagram showing a structure of a rate calculator of an ultrasonic Doppler diagnosis apparatus according to a second embodiment of the present invention.

The rate calculator of the second embodiment is constituted, as shown in FIG. 6. In this rate calculator, a ROM 41 is directly connected to the ASC 9D of the MTI system 9, and also connected thereto through a frame memory 42. The frame memory 42 delays the average speed V supplied from the ASC 9D by one frame and outputs a delayed signal to the ROM 41. The ROM 41 thus inputs the average speeds Vn and Vn−1 of adjacent two frames, which are synchronized with each other, and outputs the speed variation rate R obtained from the following equation (4).

$$R = |(Vn-1 - Vn)/Vn| \qquad (4)$$

The output signal of the ROM 41 is supplied to the DSC 11 through the frame memory 43.

Figure 7:
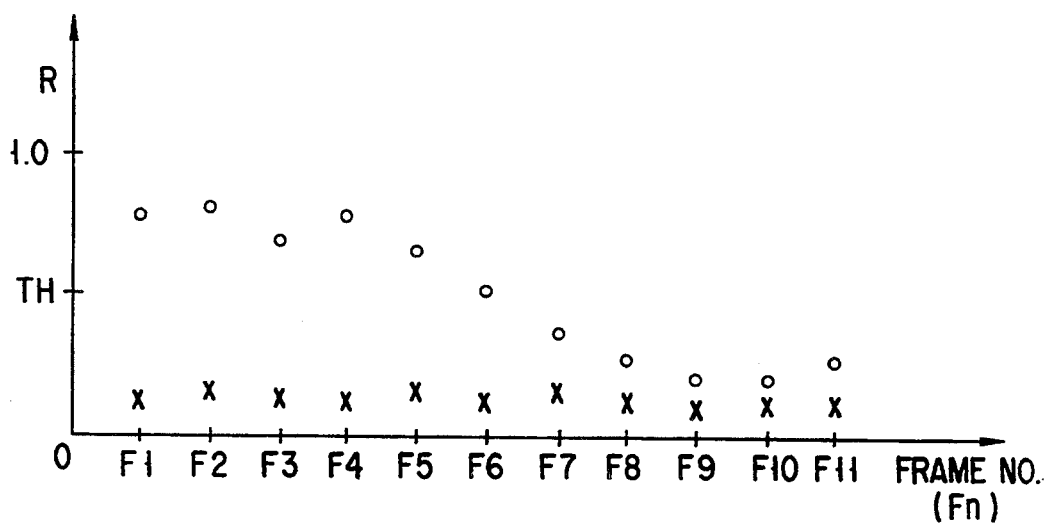
FIG. 7 is a view showing a variation in speed of corpuscles at each point of the artery system and the vein system.

The average speeds V have an angle dependence characteristic of the angle $\theta$ between the direction of the ultrasonic beam and that of the flowing blood. However, as is seen from the equation (4), the speed variation rate R has no angle dependence characteristics since R is expressed as a ratio of the average speeds V. Consequently, during the period of heartbeat, the speed variation rate R of the artery system indicated by "o" in FIG. 7 is clearly distinguished from the speed variation rate R of the vein system indicated by "x" in FIG. 7.

As described above, the same advantage as that of the first embodiment can be obtained from the second embodiment, and the second embodiment has a unique advantage of displaying the speed variation rate.

The present invention is not limited to the above embodiments. Various changes and modifications can be made. For example, the equations (3) and (4) can be replaced with other equations if the speed variation rate R can be expressed as a ratio of the average speeds V. Furthermore, the equations (3) and (4) can be multiplied by plural numbers and, in this case, the speed variation rate is increased, and the flowing blood of the artery system and that of the vein system can be clearly distinguished from each other.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An ultrasonic Doppler diagnosis apparatus comprising:
   scan means for scanning a two-dimensional region of a subject with an ultrasonic beam;
   detection means for detecting a Doppler deviation frequency of respective positions included in the two-dimensional region based on a signal output from said scan means;
   calculation means for calculating a rate of variation between two Doppler deviation frequencies of the same position, which are detected by said detection means at different times;
   convert means for converting a color signal to said rate of variation in accordance with a level of said rate of variation; and
   display means for displaying a two-dimensional distribution of said color signal.

2. The ultrasonic Doppler diagnosis apparatus according to claim 1, wherein said convert means converts a color signal of different color phases in accordance with results of comparison of a level of said rate of variation and a predetermined level.

3. The ultrasonic Doppler diagnosis apparatus according to claim 2, wherein said calculation means extracts a maximum frequency and a minimum frequency from a plurality of Doppler deviation frequencies detected within a predetermined period of time by said detection means to calculate said rate of variation between said maximum frequency and said minimum frequency.

4. The ultrasonic Doppler diagnosis apparatus according to claim 2, wherein said calculation means calculates said frequencies detected successively by said detection means.

5. The ultrasonic Doppler diagnosis apparatus according to claim 4, wherein said calculation means divides a difference between one of said two Doppler deviation frequencies and the other Doppler deviation frequency by said one of said two Doppler deviation frequencies, to calculate said rate of variation.

6. The ultrasonic Doppler diagnosis apparatus according to claim 3, wherein said calculation means divides a difference between said maximum frequency and said minimum frequency by said maximum frequency to calculate said rate of variation.

7. The ultrasonic Doppler diagnosis apparatus according to claim 6, wherein said predetermined period of time are set in accordance with a cycle of heartbeat of said subject.

* * * * *

UNITED STATES PATENT AND TRADEMARK OFFICE
CERTIFICATE OF CORRECTION

PATENT NO. : 5,377,684
DATED : January 03, 1995
INVENTOR(S) : Kiyoshi HARA

It is certified that error appears in the above-indentified patent and that said Letters Patent is hereby corrected as shown below:

Claim 7, Column 8, Line 42, change "are" to --is--.

Title page, Column 1, in the name of the assignee, change "toshiba" to --Toshiba--.

Signed and Sealed this

Eighth Day of August, 1995

BRUCE LEHMAN

Attest:

Attesting Officer

Commissioner of Patents and Trademarks